United States Patent
Foxworthy et al.

(10) Patent No.: US 8,948,149 B2
(45) Date of Patent: *Feb. 3, 2015

(54) ACCESS NODE/GATEWAY TO ACCESS NODE/GATEWAY LAYER-2 CONNECTIVITY (END-TO-END)

(71) Applicant: ViaSat, Inc., Carlsbad, CA (US)

(72) Inventors: Michael Foxworthy, Carlsbad, CA (US); Girish Chandran, Carlsbad, CA (US); Jason Lau, Lafayette, LA (US)

(73) Assignee: ViaSat, Inc., Carlsbad, CA (US)

( * ) Notice: Subject to any disclaimer, the term of this patent is extended or adjusted under 35 U.S.C. 154(b) by 245 days.

This patent is subject to a terminal disclaimer.

(21) Appl. No.: 13/689,369

(22) Filed: Nov. 29, 2012

(65) Prior Publication Data

US 2013/0089024 A1 Apr. 11, 2013

Related U.S. Application Data

(63) Continuation of application No. 12/761,858, filed on Apr. 16, 2010, now Pat. No. 8,345,650.

(60) Provisional application No. 61/170,359, filed on Apr. 17, 2009, provisional application No. 61/254,553, filed on Oct. 23, 2009.

(51) Int. Cl.
*H04W 4/00* (2009.01)
*H04B 7/185* (2006.01)
*H04L 12/46* (2006.01)

(52) U.S. Cl.
CPC ........ *H04B 7/18513* (2013.01); *H04L 12/4645* (2013.01)
USPC .......................................................... 370/338

(58) Field of Classification Search
USPC ................. 370/338, 349, 392, 409, 474, 475; 709/243; 455/12.1
See application file for complete search history.

(56) References Cited

U.S. PATENT DOCUMENTS

| 5,717,686 A | 2/1998 | Schiavoni |
| 5,875,461 A | 2/1999 | Lindholm |

(Continued)

FOREIGN PATENT DOCUMENTS

| GB | 2374494 A | 10/2002 |
| WO | WO-03/021866 A | 3/2003 |

(Continued)

OTHER PUBLICATIONS

Non-final Office Action dated Mar. 6, 2012, Layer-2 Extension Services, U.S. Appl. No. 12/761,882, 23 pgs.

(Continued)

*Primary Examiner* — Jeffrey M Rutkowski
(74) *Attorney, Agent, or Firm* — Holland & Hart LLP

(57) ABSTRACT

Systems, methods, and apparatus for providing end-to-end L2 connectivity, are described. The system includes satellites configured to transmit data packets. The system further includes a first non-autonomous gateway in communication with the satellites. The first non-autonomous gateway is configured to receive the data packets from the satellites at L1, generate virtual tagging tuples within L2 packet headers of the data packets, and transmit the data packets each including a virtual tagging tuple. The system further includes a L2 switch in communication with the first non-autonomous gateway. The L2 switch is configured to receive the virtually tagged data packets and transmit the virtually tagged data packets. Further, the system includes a second non-autonomous gateway in communication with the L2 switch. The second non-autonomous gateway configured to receive the virtually tagged data packets and transmit the virtually tagged data packets to an entity based on the virtual tagging tuple associated with each of the virtually tagged packets.

20 Claims, 12 Drawing Sheets

(56) References Cited

U.S. PATENT DOCUMENTS

| | | | |
|---|---|---|---|
| 5,899,980 A | 5/1999 | Wilf et al. | |
| 5,940,394 A | 8/1999 | Killian | |
| 6,052,560 A | 4/2000 | Karabinis | |
| 6,112,083 A | 8/2000 | Sweet et al. | |
| 6,240,072 B1 | 5/2001 | Lo et al. | |
| 6,249,677 B1 | 6/2001 | Noerpel et al. | |
| 6,934,262 B1 | 8/2005 | Lau et al. | |
| 7,017,042 B1 | 3/2006 | Ziai et al. | |
| 7,032,242 B1 | 4/2006 | Grabelsky et al. | |
| 7,174,373 B1 | 2/2007 | Lausier | |
| 7,237,017 B1* | 6/2007 | Pecus et al. | 709/223 |
| 7,289,440 B1 | 10/2007 | Beshal et al. | |
| 7,386,723 B2 | 6/2008 | Seada et al. | |
| 7,889,728 B2 | 2/2011 | Arad et al. | |
| 7,983,255 B2 | 7/2011 | Kue | |
| 7,992,174 B2 | 8/2011 | Gin et al. | |
| 8,019,841 B2 | 9/2011 | Ellis et al. | |
| 8,081,633 B2 | 12/2011 | Veits | |
| 8,195,090 B2 | 6/2012 | Treesh et al. | |
| 8,208,421 B2 | 6/2012 | Dankberg et al. | |
| 8,274,981 B2 | 9/2012 | Foxworthy et al. | |
| 2001/0026537 A1 | 10/2001 | Massey | |
| 2001/0033580 A1 | 10/2001 | Dorsey et al. | |
| 2001/0036161 A1 | 11/2001 | Eidenschink et al. | |
| 2003/0048766 A1 | 3/2003 | D-Annunzio et al. | |
| 2003/0069926 A1 | 4/2003 | Weaver et al. | |
| 2004/0208121 A1 | 10/2004 | Gin et al. | |
| 2006/0047851 A1 | 3/2006 | Voit et al. | |
| 2006/0050736 A1 | 3/2006 | Segel | |
| 2006/0171369 A1 | 8/2006 | Ostrup et al. | |
| 2006/0262724 A1 | 11/2006 | Friedman et al. | |
| 2006/0274744 A1 | 12/2006 | Nagai et al. | |
| 2007/0076607 A1 | 4/2007 | Voit et al. | |
| 2007/0104096 A1 | 5/2007 | Ribera | |
| 2007/0147279 A1 | 6/2007 | Smith et al. | |
| 2007/0171918 A1 | 7/2007 | Ota et al. | |
| 2007/0213060 A1 | 9/2007 | Shaheen | |
| 2007/0255829 A1* | 11/2007 | Pecus et al. | 709/225 |
| 2008/0043663 A1* | 2/2008 | Youssefzadeh et al. | 370/321 |
| 2008/0212517 A1* | 9/2008 | Thesling | 370/316 |
| 2009/0067429 A1 | 3/2009 | Nagai et al. | |
| 2009/0092137 A1 | 4/2009 | Haigh et al. | |
| 2009/0093213 A1 | 4/2009 | Miller et al. | |
| 2010/0260043 A1 | 10/2010 | Kimmich et al. | |
| 2010/0265876 A1 | 10/2010 | Foxworthy et al. | |
| 2010/0265877 A1 | 10/2010 | Foxworthy et al. | |
| 2010/0265878 A1 | 10/2010 | Foxworthy et al. | |
| 2010/0265879 A1 | 10/2010 | Foxworthy et al. | |
| 2010/0265941 A1 | 10/2010 | Foxworthy et al. | |
| 2010/0265957 A1 | 10/2010 | Foxworthy et al. | |

FOREIGN PATENT DOCUMENTS

| | | | |
|---|---|---|---|
| WO | WO-2005/082040 A | 9/2005 | |
| WO | WO-2007/103369 A | 9/2007 | |
| WO | WO-2007/133786 A | 11/2007 | |

OTHER PUBLICATIONS

Final Office Action dated Jul. 24, 2012, Layer-2 Extension Services, U.S. Appl. No. 12/761,882, 10 pgs.

Non-final Office Action dated Mar. 20, 2012, Acceleration Through a Network Tunnel, U.S. Appl. No. 12/761,996, 17 pgs.

Notice of Allowance dated Jul. 27, 2012, Acceleration Through a Network Tunnel, U.S. Appl. No. 12/761,996, 15 pgs.

Non-final Office Action dated May 18, 2012, Layer-2 Connectivity from Switch to Access Node/Gateway, U.S. Appl. No. 12/761,834, 17 pgs.

Notice of Allowance dated Oct. 11, 2012, Layer-2 Connectivity from Switch to Access Node/Gateway, U.S. Appl. No. 12/761,834, 11 pgs.

Notice of Allowance and Examiner Initiated Interview Summary dated Jun. 21, 2012, Access Node/Gateway to Access Node/Gateway Layer-2 Connectivity (End-to-End), U.S. Appl. No. 12/761,858, 18 pgs.

Notice of Allowance and Examiner Initiated Interview Summary dated Aug. 29, 2012, Access Node/Gateway to Access Node/Gateway Layer-2 Connectivity (End-to-End), U.S. Appl. No. 12/761,858, 11 pgs.

Non-final Office Action dated Jun. 15, 2012, Mobility Across Satellite Beams Using L2 Connectivity, U.S. Appl. No. 12/761,904, 12 pgs.

Non-final Office Action dated Aug. 21, 2012, Multi-satellite Architecture, U.S. Appl. No. 12/761,941, 23 pgs.

Non-final Office Action dated Mar. 21, 2012, Core-based Satellite Network Architecture, U.S. Appl. No. 12/761,968, 17 pgs.

Notice of Allowance dated Jul. 31, 2012, Core-based Satellite Network Architecture, U.S. Appl. No. 12/761,968, 12 pgs.

PCT International Search Report and Written Opinion dated Jul. 23, 2010, Int'l App. No. PCT/US2010/031509, 10 pgs.

PCT International Preliminary Report on Patentability dated Jul. 1, 2011, Int'l App. No. PCT/US2010/031509, 9 pgs.

PCT International Search Report and Written Opinion dated Jul. 23, 2010, Int'l App. No. PCT/US2010/031514, 9 pgs.

PCT International Preliminary Report on Patentability dated May 23, 2011, Int'l App. No. PCT/US2010/031514, 9 pgs.

PCT International Search Report and Written Opinion dated Jul. 28, 2010, Int'l App. No. PCT/US2010/031508, 10 pgs.

PCT International Preliminary Report on Patentability dated Jul. 1, 2011, Int'l App. No. PCT/US2010/031508, 11 pgs.

PCT International Search Report and Written Opinion dated Aug. 2, 2010, Int'l App. No. PCT/US2010/031510, 10 pgs.

PCT International Preliminary Report on Patentability dated Jul. 1, 2011, Int'l App. No. PCT/US2010/031510, 12 pgs.

PCT International Search Report and Written Opinion dated Sep. 3, 2010, Int'l App. No. PCT/US2010/031511, 10 pgs.

PCT International Preliminary Report on Patentability dated Aug. 2, 2011, Int'l App. No. PCT/US2010/031511, 12 pgs.

PCT International Search Report and Written Opinion dated Sep. 20, 2010, Int'l App. No. PCT/US2010/031515, 19 pgs.

PCT International Preliminary Report on Patentability dated Aug. 2, 2011, Int'l App. No. PCT/US2010/031515, 12 pgs.

PCT International Search Report and Written Opinion dated Nov. 23, 2010, Int'l App. No. PCT/US2010/031513, 15 pgs.

PCT Revised International Search Report and Written Opinion dated Jul. 1, 2011, Int'l App. No. PCT/US2010/031513, 17 pgs.

PCT International Preliminary Report on Patentability dated Aug. 2, 2011, Int'l App. No. PCT/US2010/031513, 15 pgs.

Akyildiz et al., "A Survey of Mobility Management in Next-Generation All-IP-Based Wireless Systems," IEEE Wireless Communications, IEEE Service Center, Piscataway, NJ, US vol. 11, No. 4, Aug. 1, 2004, pp. 16-28.

Akyildiz et al., "Mobility Management in Current and Future Communications Network," IEEE Network, IEEE Service Center, New York, NY USA, vol. 12, No. 4, Jul. 1, 1998, pp. 39-49.

Akyildiz et al., "Mobility Management in Next-Generation Wireless Systems," Proceedings of the IEEE, New York, US, vol. 87, No. 8, Aug. 1, 1999.

Feltrin et al., "Design, Implementation and Performances of an On-board Processor-based Satellite Network," Communications, 2004 IEEE International Conference on, vol. 6, No., pp. 3321-3325, Jun. 20-24, 2004.

Held, "Virtual Private Networking, Introduction to Virtual Private Networking," Dec. 31, 2004, Virtual private Networking: a Contstruction Operation and Utilization Guide, Joh Wiley & Sons, GB, pp. 1-22.

Industrial Consortium for S-UMTS, "Final Report S-UMTS: Preparation of Next Generation Universal Mobile Satellite Telecommunications Systems," Nov. 29, 2000, pp. 1-35.

Kota, et al., "Integrated SATCOM/Terrestrial Networking: Protocols and DISN/Teleport Interface," Proceedings of the Military Communications Conference (MILCOM), San Diego, Nov. 6-8, 1995, New York, IEEE, US, vol. 1, Nov. 6, 1995, pp. 453-459, XP-000580864.

LAN/MAN Standards Committee of the IEEE Computer Society, IEEE Standard for Local and Metropolitan Area Networks—Virtual Bridged Local Area Networks, IEEE Std 802.1QTM-2005, May 19, 2006, The Institute of Electrical and Electronics Engineers, Inc., USA, 303 pgs.

(56) References Cited

OTHER PUBLICATIONS

Mancuso et al., "Switched Ethernet networking Over LEO Satellite," Wireless Communication Systems, 2005, 2nd International Symposium on Siena, Italy, Sep. 5-9, 2005, Piscataway, NJ, US, IEEE, pp. 883-887, Sections I.-IV., pp. 883-887.

Shen, "Handover in Packet-Domain UMTS," EE Times Design, Aug. 2, 2002, retrieved from the internet on Aug. 2, 2010 at: http://www.eetimes.com/design/communications-design/4018087/Handover-in-packet-Domain-UMTS, pp. 1-6.

Shneyderman, "Mobile VPNs for Next Generation GPRS and UMTS Networks," White Paper Lucent Technologies, Dec. 31, 2000, retrieved online at: www.esoumoy.free.fr/telecom/tutorial/3G-VPN.pdf, 16 pgs.

Senevirathne et al., "Ethernet Over IP—a Layer 2 VPN Solution Using Generic Routing Encapsulation (GRE)," working document of the Internet Engineering Task Force (IETF), http://tools.ietf.org/html/draft-tsenevir-l2vpn-gre-00#section-2, 6 pgs.

Notice of Allowance dated Feb. 7, 2013, Mobility Across Satellite Beams Using L2 Connectivity, U.S. Appl. No. 12/761,904, 13 pgs.

Notice of Allowance dated Dec. 19, 2012, Multi-satellite Architecture, U.S. Appl. No. 12/761,941, 9 pgs.

\* cited by examiner

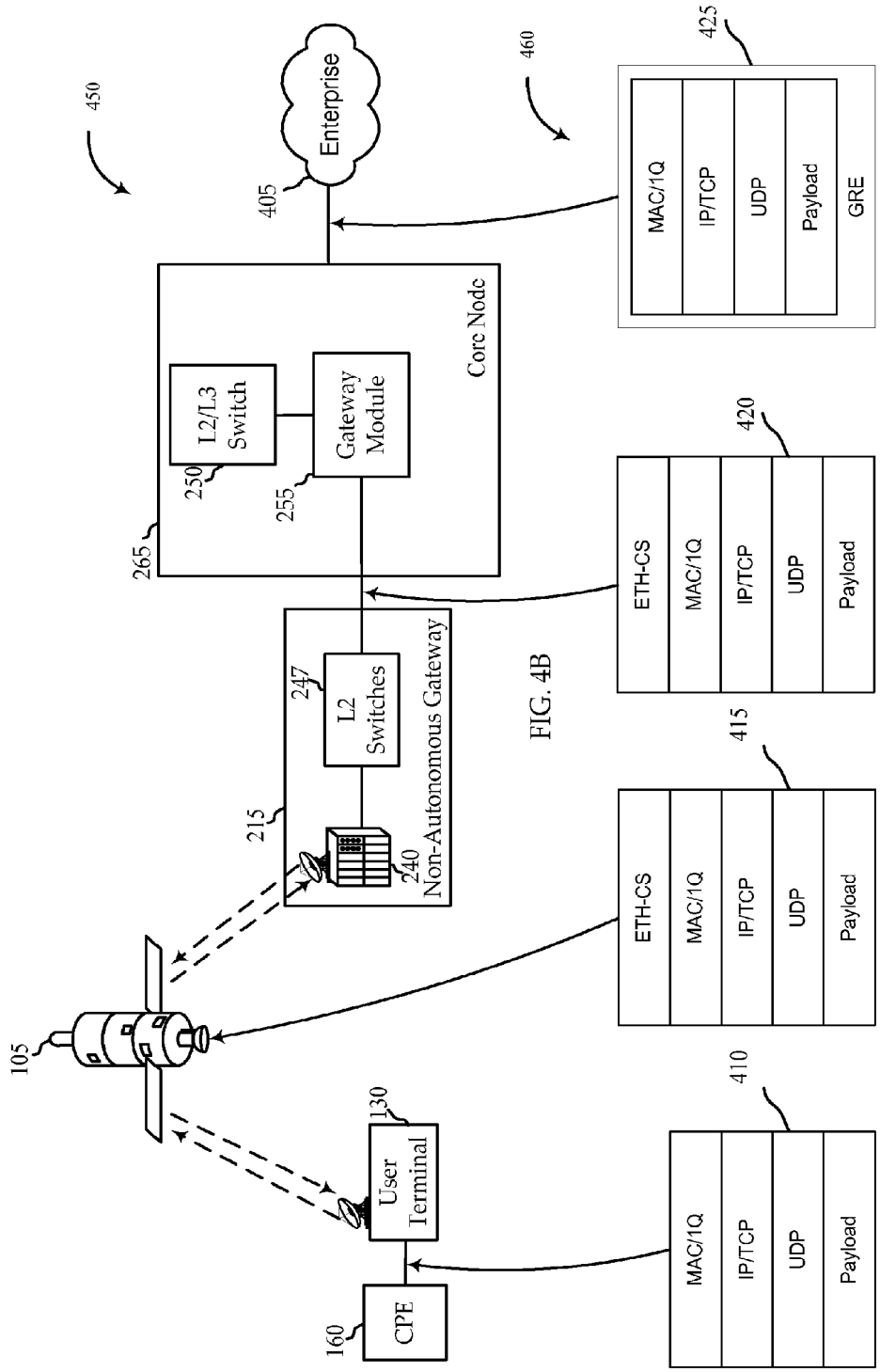

ACCESS NODE/GATEWAY TO ACCESS NODE/GATEWAY LAYER-2 CONNECTIVITY (END-TO-END)

PRIORITY CLAIM

This Application is a continuation of co-pending U.S. patent application Ser. No. 12/761,858, entitled ACCESS NODE/GATEWAY TO ACCESS NODE/GATEWAY LAYER-2 CONNECTIVITY (END-TO-END), filed on Apr. 16, 2010, which is hereby incorporated by reference in its entirety for any and all purposes. U.S. patent application Ser. No. 12/761,858 claims priority to U.S. Provisional Patent Application No. 61/170,359, entitled DISTRIBUTED BASE STATION SATELLITE TOPOLOGY, filed on Apr. 17, 2009, and also claims priority to U.S. Provisional Patent Application No. 61/254,553, entitled ACCESS NODE/GATEWAY TO ACCESS NODE/GATEWAY LAYER-2 CONNECTIVITY (END-TO-END), filed on Oct. 23, 2009, which are both incorporated by reference in their entirety for any and all purposes.

BACKGROUND

Satellite communications systems are becoming ubiquitous for communicating large amounts of data over large geographic regions. In typical satellite communications systems, end consumers interface with the systems through user terminals. The user terminals communicate, via one or more satellites, with one or more gateways. The gateways may then process and route the data to and from one or more networks according to various network protocols and tags processed at the network layer and above (e.g., layers 3 and above of the Open System Interconnection Reference Model (OSI) stack).

While utilizing higher layers to route communications may provide certain features, such as enhanced interoperability, it may also limit certain capabilities of the network. For example, routing limits the types of tags that can persist across multiple sub-networks. For these and/or other reasons, it may be desirable to provide ground-segment networking with enhanced functionality.

SUMMARY OF THE INVENTION

In one embodiment, a systems for providing end-to-end L2 connectivity, are described. The system includes satellites configured to transmit data packets. The system further includes a first non-autonomous gateway in communication with the satellites. The first non-autonomous gateway is configured to receive the data packets from the satellites at L1, generate virtual tagging tuples within L2 packet headers of the data packets, and transmit the data packets each including a virtual tagging tuple. The system further includes a L2 switch in communication with the first non-autonomous gateway. The L2 switch is configured to receive the virtually tagged data packets and transmit the virtually tagged data packets. Further, the system includes a second non-autonomous gateway in communication with the L2 switch. The second non-autonomous gateway configured to receive the virtually tagged data packets and transmit the virtually tagged data packets to an entity based on the virtual tagging tuple associated with each of the virtually tagged packets.

In another embodiment, a method of providing end-to-end layer-2 connectivity throughout a non-routed ground segment network connected to one or more satellites, is described. The method includes transmitting, by the one or more satellites, data packets, receiving, at a first non-autonomous gateway in communication with the one or more satellites. The data packets from the one or more satellites at layer-1 (L1) of the OSI-model.

The method further includes generating, by the first non-autonomous gateway, a plurality of virtual tagging tuples within the layer-2 (L2) packet headers of the data packets. The plurality of data packets each include a virtual tagging tuple. The method further includes receiving, at a L2 switch in communication with the first non-autonomous gateway, the plurality of virtually tagged data packets, transmitting, by the L2 switch, the plurality of virtually tagged data packets, and receiving, by a second non-autonomous gateway in communication with the L2 switch, the plurality of virtually tagged data packets. Further, the method includes transmitting, by the second non-autonomous gateway, the plurality of virtually tagged data packets to an entity based on the virtual tagging tuple associated with each of the plurality of virtually tagged packets.

In yet another embodiment, a machine-readable medium for providing end-to-end layer-2 connectivity throughout a non-routed ground segment network connected to one or more satellites, is described. The machine-readable medium includes instructions for transmitting, by the one or more satellites, data packets, receiving, at a first non-autonomous gateway in communication with the one or more satellites. The data packets from the one or more satellites at layer-1 (L1) of the OSI-model. The machine-readable medium further includes instructions for generating, by the first non-autonomous gateway, a plurality of virtual tagging tuples within the layer-2 (L2) packet headers of the data packets. The plurality of data packets each include a virtual tagging tuple. The machine-readable medium further includes instructions for receiving, at a L2 switch in communication with the first non-autonomous gateway, the plurality of virtually tagged data packets, transmitting, by the L2 switch, the plurality of virtually tagged data packets, and receiving, by a second non-autonomous gateway in communication with the L2 switch, the plurality of virtually tagged data packets. Further, the machine-readable medium includes instructions for transmitting, by the second non-autonomous gateway, the plurality of virtually tagged data packets to an entity based on the virtual tagging tuple associated with each of the plurality of virtually tagged packets.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

FIG. 4B shows an illustrative communication link for an enterprise customer in a system, like the one shown in FIG. 4A.

FIG. 4C shows an illustrative data flow through the communication link of FIG. 4B.

DESCRIPTION

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment, it being understood that various changes may be made in the function and arrangement of elements without departing from the spirit and scope as set forth in the appended claims. Some of the various exemplary embodiments may be summarized as follows.

In many typical satellite communications systems, end consumers interface with the systems through user terminals. The user terminals communicate, via one or more satellites, with one or more gateways. The gateways may then process and route the data to and from one or more networks according to various network protocols and tags processed at the network layer and above (e.g., layers 3 and above of the Open System Interconnection Reference Model (OSI) stack).

Figure 1:
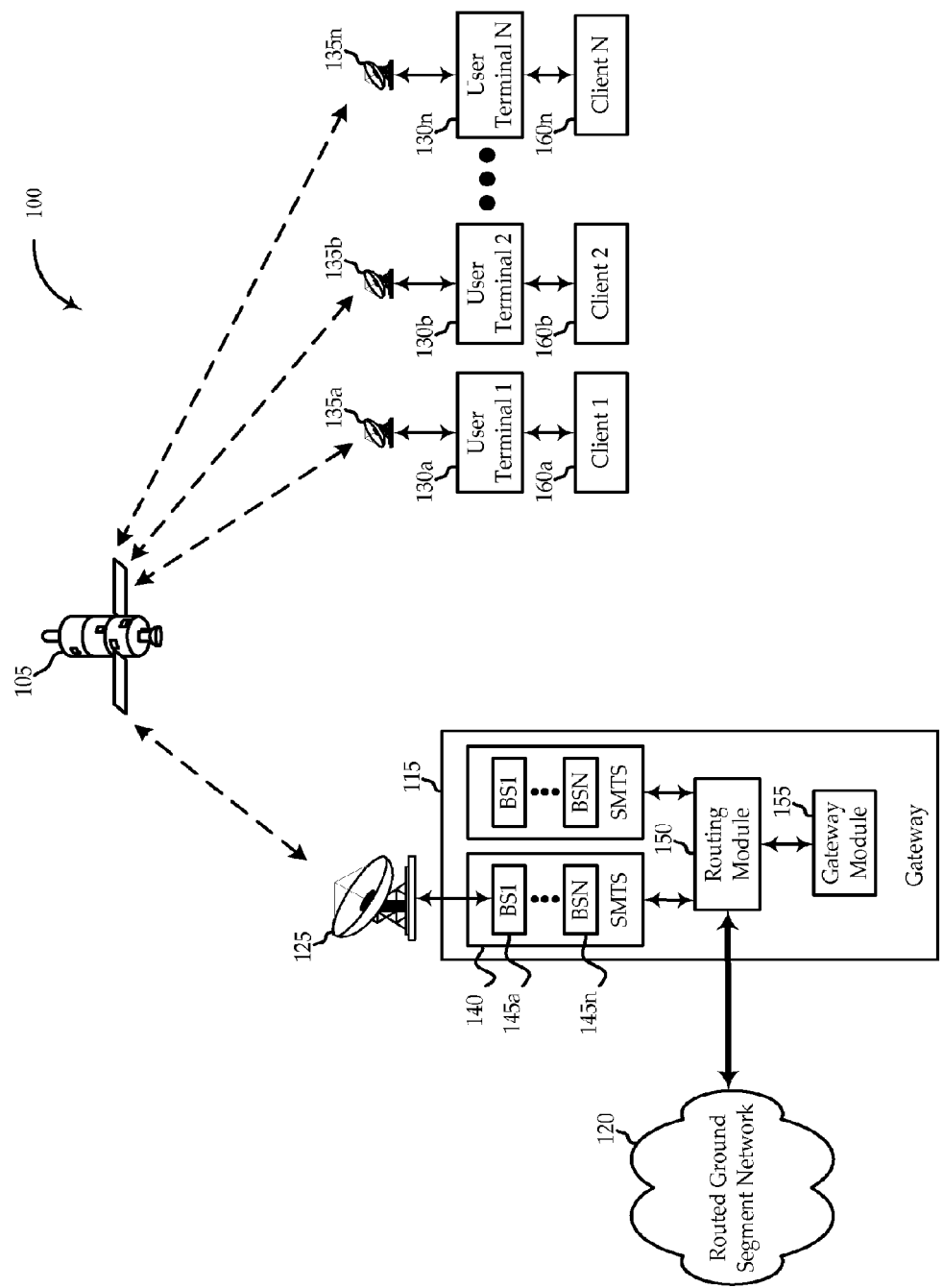
FIG. 1 illustrates a typical satellite communications system having a typical gateway in communication with a routed network.

For example, FIG. 1 illustrates a typical satellite communications system 100. The satellite communications system 100 includes a number of user terminals 130 in communication with a gateway 115 via a satellite 105. For example, a subscriber of satellite communications services desires to access a web page using a browser. The subscriber's client 160 (e.g., a client application running on customer premises equipment controlled by the subscriber) may communicate an HTML request through a respective one of the user terminals 130. A user antenna 135 in communication with the respective user terminal 130 communicates the request to the satellite 105, which, in turn, sends the request to the gateway 115 through a provider antenna 125.

The gateway 115 receives the request at a base station 145 configured to service that user terminal 130 and included within a satellite modem termination system (SMTS) 140. The SMTS 140 sends the request data to a routing module 150, in communication with a gateway module 155. The routing module 150 and gateway module 155 work together to determine and generate routing data for communicating the request data through a routed ground segment network 120. Typically, the gateway module 155 may be a control plane application which sets up connectivity to the router. Even where actual routing is not done by the gateway module 155, components of the gateway 115 may implement routing functions.

As used herein, a "routed network" refers to a network having a number of routers, configured to use protocols at layer-3 and above of the OSI stack (e.g., or substantially equivalent types of protocols) to route data through the network. The "routing module," as used herein, is intended to broadly include any type of network device configured to route at layers 3 and above of the OSI stack (e.g., or provide substantially similar network layer functionality). Particularly, routing is intended to be distinguished from switching (e.g., at layer 2 of the OSI stack (e.g., or substantially similar functionality), as will become more clear from the description below.

While utilizing higher layers to route communications may provide certain features, such as enhanced interoperability, it may also limit certain capabilities of the network. As one exemplary limitation, at each node where a layer-3 routing decision is made, determining the appropriate routing may involve parsing packet headers, evaluating parsed header information against routing tables and port designations, etc. These steps may limit the amount and type of traffic that can be sent over the network, as well as the protocols available for transport on the network.

In another exemplary limitation, at each router, layer-2 headers are typically stripped off and replaced with other tags to identify at least the next routing of the data through the network. As such, it is impossible to maintain a single network between routed terminals. In other words, a packet which is generated at one LAN, passes through one or more routers (i.e., at layer-3 or above) and is received at another LAN, will always be considered to be received from a different network. Accordingly, any benefit of a single network configuration is unattainable in a layer-3 routed network. For example, tags for supporting proprietary service provider networks, Multiprotocol Label Switching (MPLS), and/or other types of networks are impossible to maintain across large geographic regions (e.g., multiple LANs, WANs, subnets, etc.) of a routed ground segment network 120.

In the illustrative example, internet protocol (IP) and/or other tags are used to route the request data to an appropriate IP address for use in satisfying the subscriber's request. When a response to the request is received by the routed ground segment network 120, layer-3 and/or higher-layer tags are again used to route the response data through the network to the appropriate base station 145 in the appropriate gateway 115. The base station 145 then communicates the response data to the client 160 via the provider antenna 125, the satellite 105, the subscriber antenna 135, and the user terminal 130.

Figure 2:
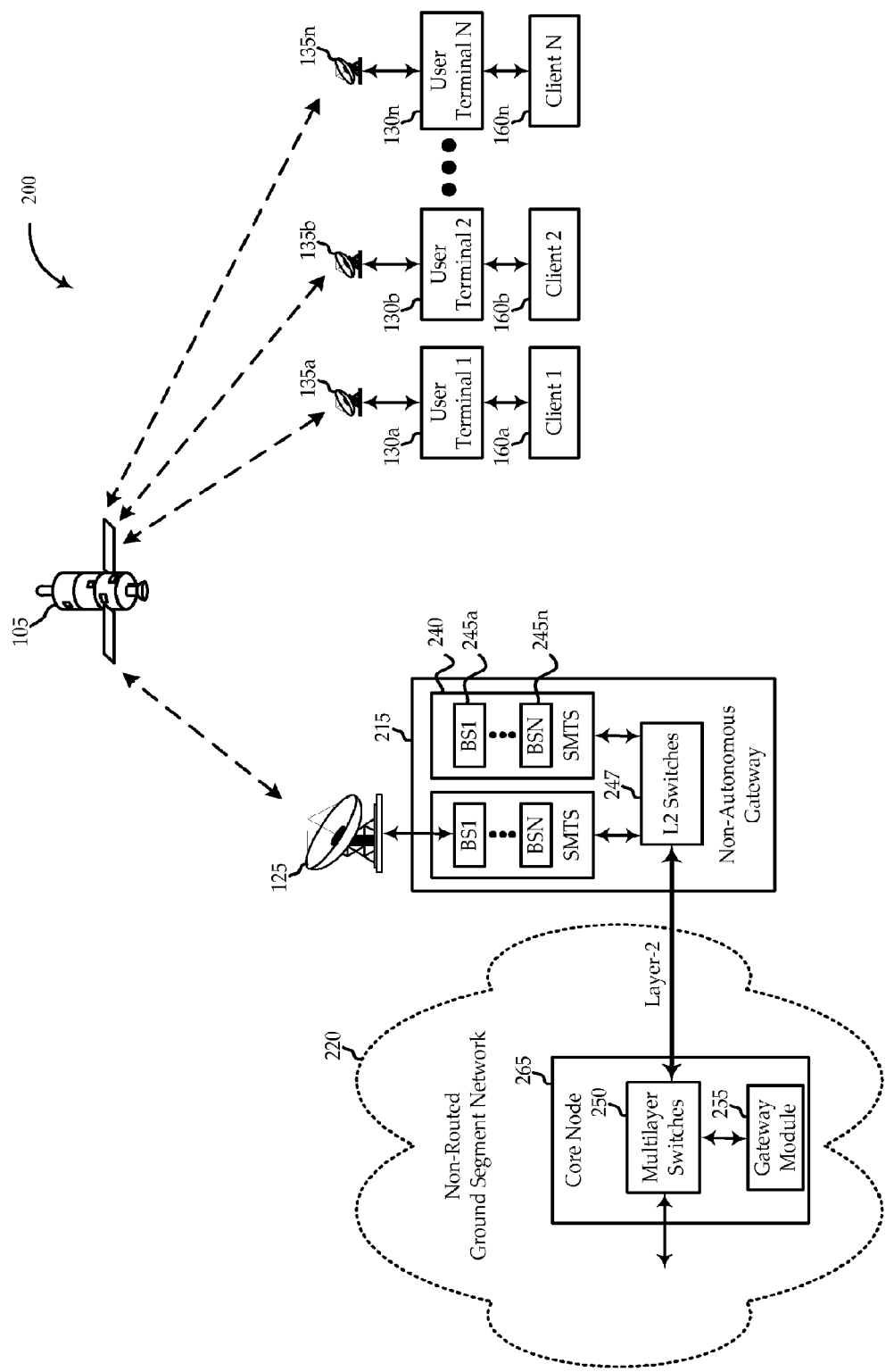
FIG. 2 shows an embodiment of a satellite communications system having a number of user terminals in communication with a non-autonomous gateway via a satellite, according to various embodiments.

Embodiments address these limitations of the routed ground segment network 120 in various ways, for example, through the use of core nodes. FIG. 2 shows an embodiment of a satellite communications system 200 having a number of user terminals 130 in communication with a non-autonomous gateway 215 via a satellite 105, according to various embodiments. The non-autonomous gateway 215 is in communication with other nodes of a non-routed ground segment network 220 (e.g., other non-autonomous gateways 215) via one or more core nodes 265. Embodiments of the satellite communications system 200 effectively provide mesh-like layer-2 connectivity between substantially all the nodes of the non-routed ground segment network 220.

In various embodiments, components of the non-routed ground segment network 220 (e.g., components of the gateways 115, core nodes 265, etc.) are implemented, in whole or in part, in hardware. They may include one or more Application Specific Integrated Circuits (ASICs) adapted to perform a subset of the applicable functions in hardware. Alternatively, the functions may be performed by one or more other processing units, on one or more integrated circuits. In other embodiments, other types of integrated circuits may be used (e.g., Structured/Platform ASICs, Field Programmable Gate Arrays and other Semi-Custom ICs), which may be programmed. Each may also be implemented, in whole or in part, with instructions embodied in a computer-readable medium, formatted to be executed by one or more general or application specific controllers.

In various embodiments, the satellite 105 is a geostationary satellite, configured to communicate with the user terminals 130 and gateways 115 using reflector antennae, lens antennae, array antennae, phased array antennae, active antennae, or any other mechanism for reception of such signals. In some embodiments, the satellite 105 operates in a multi-beam mode, transmitting a number of narrow beams, each directed at a different region of the earth. With such a multibeam satellite 105, there may be any number of different signal switching configurations on the satellite 105, allowing signals from a single gateway 115 to be switched between different spot beams. In one embodiment, the satellite 105 is configured as a "bent pipe" satellite, wherein the satellite 105 may frequency convert the received carrier signals before retransmitting these signals to their destination, but otherwise perform little or no other processing on the contents of the signals. In various embodiments, there could be a single carrier signal or multiple carrier signals for each service or feeder spot beam. In some embodiments, the subscriber antenna 135 and user terminal 130 together comprise a very small aperture terminal (VSAT), with the subscriber antenna 135 measuring less than one meter in diameter and having approximately 2 watts of power. In other embodiments, a variety of other types of subscriber antennae 135 may be used at the user terminal 130 to receive the signal from the satellite 105.

In certain embodiments, the satellite communications system 200 has its nodes (e.g., non-autonomous gateways 215, core nodes 265, etc.) distributed over a large geographic region (e.g., across the United States of America). Each core node 265 may be configured to support up to twenty non-autonomous gateways 215, each non-autonomous gateway 215 may be configured to support up to four user links, and each user link may support thousands of clients 160. For example, the satellite 105 may operate in a multi-beam mode, transmitting a number of spot beams, each directed at a different region of the earth. Each spot beam may be associated with one of the user links, and used to communicate between the satellite 105 and thousands of user terminals 130. With such a multi-beam satellite 105, there may be any number of different signal switching configurations on the satellite 105, allowing signals from a single gateway 115 to be switched between different spot beams.

In one illustrative case, a subscriber of satellite communications services desires to access a web page using a browser. The subscriber's client 160 (e.g., a client application running on customer premises equipment controlled by the subscriber) may communicate an HTML request through a respective one of the user terminals 130. A user antenna 135 in communication with the respective user terminal 130 communicates the request to the satellite 105, which, in turn, sends the request to the non-autonomous gateway 215 through a provider antenna 125.

The non-autonomous gateway 215 receives the request at a base station 245 configured to service that user terminal 130 and included within a satellite modem termination system (SMTS) 240. Unlike in FIG. 1, where the SMTS 140 sends the request data to a routing module 150, the SMTS 240 of FIG. 2 sends the request data to one or more layer-2 (L2) switches 247. The L2 switches 247 forward the data to a core node 265 or other node of the non-routed ground segment network 220 according to layer-2 (e.g., or substantially equivalent) information. For example, unlike the router module 150 of FIG. 1, the L2 switches 247 may not expend substantial resources analyzing higher layer tags (e.g., parsing IP headers) and may not strip off tags for the sake of packet routing. Furthermore, all terminals, code nodes, non-autonomous gateways, autonomous gateways, etc. are all able to be on a single contiguous network.

In some embodiments, all data in the non-routed ground segment network 220 being communicated between two non-autonomous gateways 215 passes through at least one core node 265. The core node 265 may include one or more multilayer switches 250 and an gateway module 255. It is worth noting that, while embodiments of the typical gateway 115 of FIG. 1 are shown to include gateway modules 155, embodiments of the non-autonomous gateways 215 do not include gateway modules 255. In some embodiments, the gateway module 255 of the core node 265 is substantially the same as the gateway module 155 of FIG. 1.

When data is received at the core node 265 it may be processed in a number of different ways by the one or more multilayer switches 250. In some embodiments, the multilayer switches 250 process higher-layer information to provide certain types of functionality. For example, it may be desirable to handle packets in certain ways according to virtual private networking (VPN) tags, voice-over-IP (VoIP) designations, and/or other types of higher-layer information.

It is worth noting that embodiments of the multilayer switches 250 are configured to process routing-types of information without stripping data from the packets. In this way, embodiments of the satellite communications system 200 effectively provide mesh-like layer-2 connectivity between substantially all the nodes of the non-routed ground segment network 220. One feature of this type of layer-2 connectivity is that embodiments may perform higher layer processing only (e.g., or primarily) at the core nodes 265, which may substantially speed up communications through the non-routed ground segment network 220. Another feature is that embodiments of the non-routed ground segment network 220 may allow certain types of information (e.g., VPLS tags, proprietary network services tags, etc.) to persist across multiple sub-networks. These and other features will be further appreciated from the description below.

Figure 3:
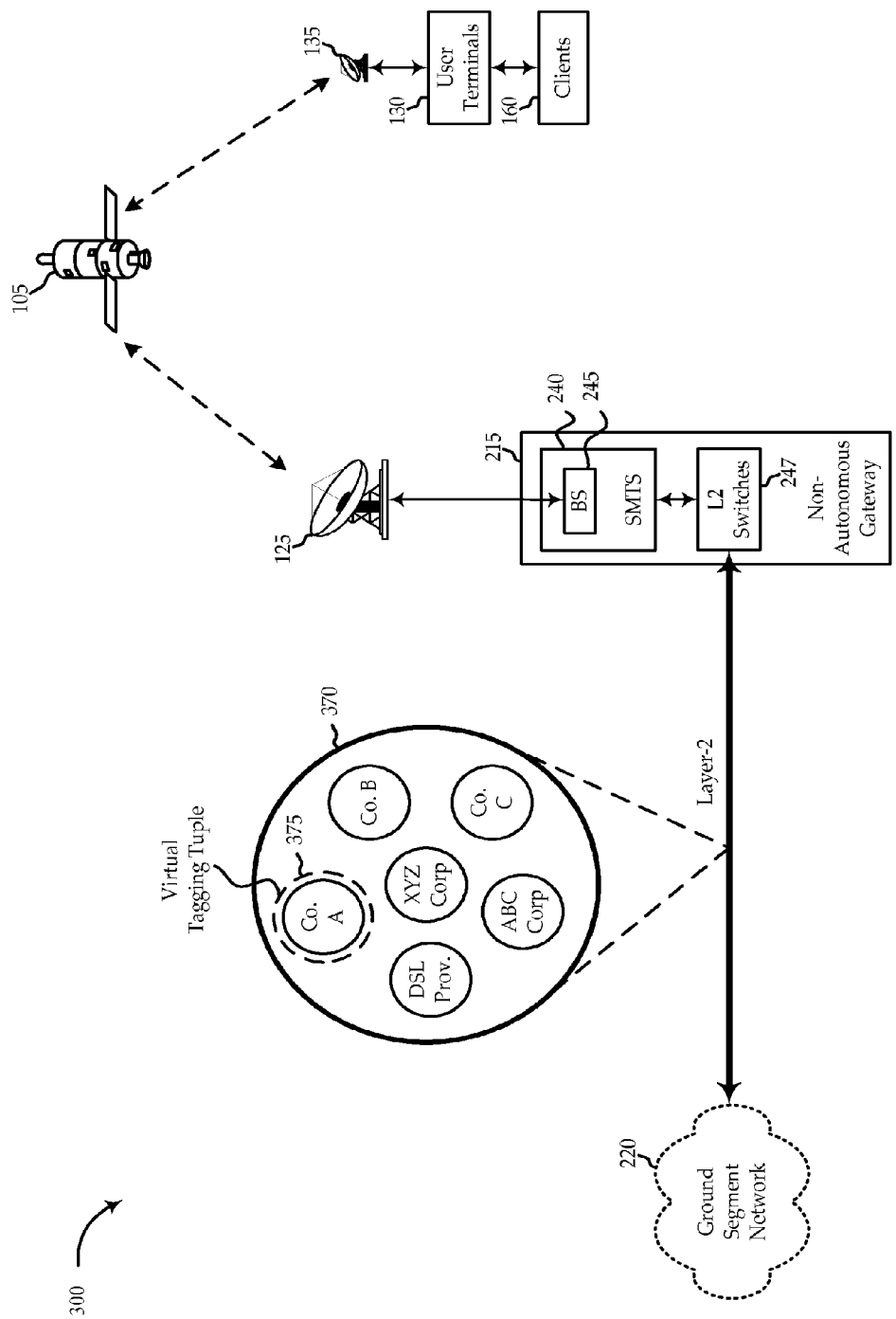
FIG. 3 shows an embodiment of a satellite communications system having a user terminal in communication with a non-autonomous gateway via a satellite, where the non-autonomous gateway is further in communication with nodes of a non-routed ground segment network using virtual tagging tuples, according to various embodiments.

In some embodiments, the layer-2 connectivity across the non-routed ground segment network 220 is further enabled through the use of virtual tagging tuples. FIG. 3 shows an embodiment of a satellite communications system 300 having a user terminal 130 in communication with a non-autonomous gateway 215 via a satellite 105, where the non-autonomous gateway 215 is further in communication with nodes of a non-routed ground segment network 220 using virtual tagging tuples 375, according to various embodiments. As illustrated, the non-autonomous gateway 215 is in communication with other nodes of the non-routed ground segment network 220 via a tuple-enabled communication link 370.

Embodiments of the tuple-enabled communication link 370 are configured to carry traffic according to a virtual tagging tuple 375. The virtual tagging tuple 375 may be configured to have one or more elements that virtually define information about data relevant to communicating the data through the non-routed ground segment network 220. In one embodiment, the tuple-enabled communication link 370 is implemented as a 10-Gigabit LAN PHY cable (an Ethernet cable configured according to certain local area network (LAN) physical layer (PHY) standards).

Each virtual tagging tuple 375 may "reserve" or "carve out" a certain portion of the tuple-enabled communication link 370 (e.g., the fiber trunk). Each portion may be associated with (e.g., purchased by) an entity. For example, the tuple-enabled communication link 370 may be virtually shared among a number of entities via the virtual tagging tuples 375, and the allotment for each entity may be based on the amount carved out for the entity. For example, if the tuple-enabled communication link 370 represents ten Gigabits per second to "sell," virtual tagging tuples 375 may be purchased in fractions of that link capacity (e.g., one-Gigabit increments). Each entity may then be serviced according to a quality of service structure or other service level agreement, according to the capacity purchased. Further, each entity may be provided with certain types of functionality associated with one or more of its virtual tagging tuples 375.

In one embodiment, the tuple-enabled communication link 370 is a fiber-optic trunk configured according to IEEE Standard 802.1Q-2005 (available at http://standards.ieee.org/get-ieee802/download/802.1Q-2005.pdf). Each virtual tagging tuple 375 may be implemented as a "VLAN tag" according to the 802.1Q standard. For example, where the tuple has two elements, "double tagging," or "Q-in-Q" tagging may be used according to the 802.1Q standard.

For example, a request for content (e.g., an HTML page, a document file, a video file, an image file, etc.) is sent from a client 160 client to a user terminal 130. The request is transmitted up to the satellite 105 and back down to the non-autonomous gateway 215 via the subscriber antenna 135 and the provider antenna 125. Components of the non-autonomous gateway 215 (e.g., one or more L2 switches 247) are configured to add virtual tagging tuples 375 to the data packets.

The virtual tagging tuples 375 added to the data packets may include an entity designation and a location of the entity, implemented as an ordered pair. For example, the entity may be "XYZ Corp," with an entity designation of "205" (or some other numeric, alpha, or alphanumeric designation). Furthermore, "XYZ Corp." may be associated with any number of locations. For example, "XYZ Corp." may have locations in Denver, Colo., San Francisco, Calif., and Rapid City, S.D., and each of these locations may be assigned a location identifier. For example, Denver, Colo. may be assigned "001," San Francisco, Calif. may be assigned "360," and Rapid City, S.D. may be assigned "101," as their location identifiers. Accordingly, virtual tagging tuple 375 "(205, 001)" may indicate traffic associated with "XYZ Corp." and destined for Denver, Colo., while virtual tagging tuple 375 "(205, 101)" would indicate traffic associated with "XYZ Corp." and destined for Rapid City, S.D.

Additional entity designations may be generated. For example, "Co. A" may have a "D24" designation, while "Co. C" may have a "450" designation. Furthermore, location identifiers may be used by multiple entities. For example, virtual tagging tuple 375 "(D24, 360)" may indicate traffic assigned to "Co. A" destined for San Francisco, Calif., while virtual tagging tuple 375 "(205, 360)" indicates traffic assigned to "XYZ Corp." also destined for San Francisco. Alternatively, each entity my have its own customized location identifier(s).

In various embodiments of the non-routed ground segment network 220, the virtual tagging tuples 375 are used to communicate the packets throughout the network without using port-based routing, destination addresses, header parsing, etc. The packets may effectively be communicated among nodes of the non-routed ground segment network 220 as if the nodes are part of a single subnet. Even geographically remote non-autonomous gateways 215 may communicate as if part of a local area network (LAN). For example, as described above, based on virtual tagging tuple 375 entity and location designations, packets may be forwarded to designated locations anywhere in the non-routed ground segment network 220. The virtual tagging tuples 375 may be used by gateway modules, switches, cross-connects, core nodes, peering routers, and/or any other node of the non-routed ground segment network 220.

Figure 4A:
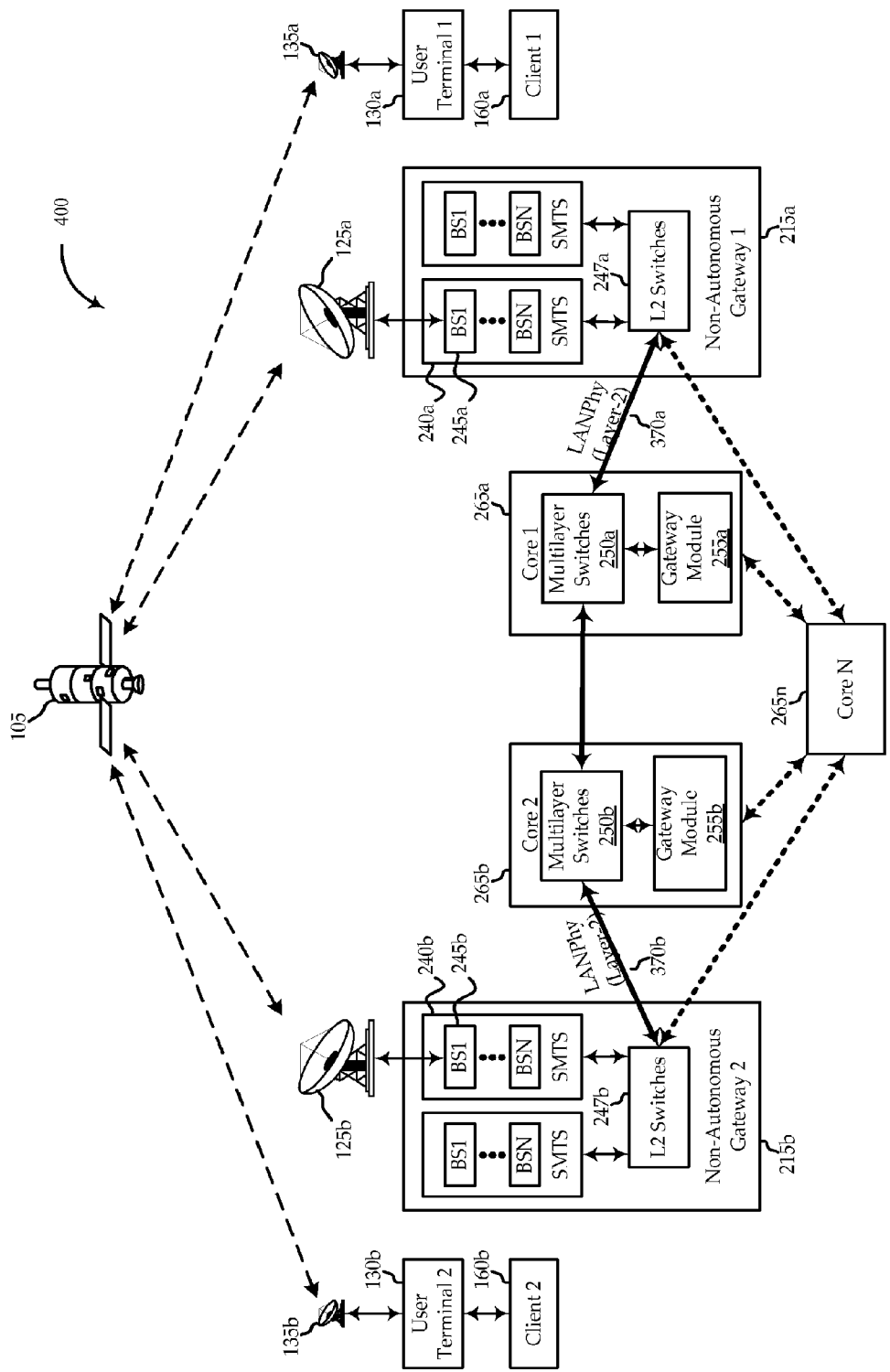
FIG. 4A shows an embodiment of a satellite communications system used for communication between two clients over a non-routed ground segment network, according to various embodiments.

In various embodiments, clients 160 may use the satellite communications system 300 to communicate, via the non-routed ground segment network 220, to any addressable location in communication with the non-routed ground segment network 220. For example, clients 160 may communicate with service providers, the Internet, content delivery networks (CDNs), other clients 160, etc. FIG. 4A shows an embodiment of a satellite communications system 400 used for communication between two clients 160 over a non-routed ground segment network 220, according to various embodiments. In some embodiments, the satellite communications system 400 is substantially equivalent (e.g., an extended illustration of) the satellite communications system 200 of FIG. 2.

A first client 160a is in communication with a first non-autonomous gateway 215a via a respective subscriber antenna 135a and provider antenna 125, and the satellite 105. The first non-autonomous gateway 215a is in communication with one or more core nodes 265 (illustrated as a first core node 265a and an nth core node 265n). For example, data is communicated from the first client 160a, destined for a second client 160b. The data is received by a first base station 245a in a first SMTS 240 in the first non-autonomous gateway 215a. The data is then switched by one or more first L2 switches 247a and sent over a first LAN PHY cable 370a to one or more first multilayer switches 250a in the first core node 265a. In the first core node 265a, the data from the first client 160a may be processed (e.g., interpreted, parsed, switched, etc.) at one or more layers by the first multilayer switches 250a and/or a first gateway module 255a.

The first core node 265a is in communication with at least a second core node 265b. The first core node 265a may determine, for example as a function of an associated virtual tagging tuple 375 or a higher-layer tag, that the data from the first client 160a should be passed to the second core node 265b. The second core node 265b may further process the communications at one or more layers by second multilayer switches 250b and/or a second gateway module 255b.

The second core node 265b may pass the data to an appropriate second non-autonomous gateway 215b, for example, over a second LAN PHY cable 370b. The second non-autonomous gateway 215b may then switch the data at layer 2 and pass the data to an appropriate second base station 245b in a second SMTS 240b in the second non-autonomous gateway 215b. For example, the second base station 245b is configured to support (e.g., or is currently switched or tuned to support) a spot beam being used to service the second client 160b. The second base station 245b may communicate the data from the second non-autonomous gateway 215b to the second client 160b via a respective provider antenna 125b and subscriber antenna 135b, and the satellite 105.

It is worth noting that, while the first core node 265a and/or the second core node 265b may process the data at multiple layers, embodiments of the core nodes 265 are configured to maintain layer-2 connectivity across the communication. In fact, the non-autonomous gateways 215, core nodes 265, and other nodes may all be part of a non-routed ground segment network (e.g., like the non-routed ground segment network 220 of FIG. 2), and embodiments of the non-routed ground segment network may effectuate layer-2 connectivity between any two of its nodes. For example, the first non-autonomous gateway 215a and the second non-autonomous gateway 215b act as if they are on a single subnet (e.g., LAN), regardless of the number of nodes through which the data passes, the distance over which it is communicated, the number of sub-networks employed, etc.

It will be appreciated that a large non-routed ground segment network may include a number of different types of nodes, for example, to account for various client densities and locations, topologies (e.g., mountain ranges, lakes, etc.), etc. Furthermore, satellite communications network 400 enables, for example, client 1 160a and client 2 160b to function on the same network. As such, both clients are able to have an IP address on the same sub-net (e.g., 192.168.1.*), receive the same services, receive a multicast or a broadcast message, etc. In other words, client 1 and client 2 are able to be connected in the same manner similar to if were located in the same room connected to the same switch.

Of course many of these features further involve use of one or more types of data stack throughout a communication link. For example, FIG. 4B shows an illustrative communication link for an enterprise customer in a system in communication with an enterprise network 405, like the one shown in FIG. 4A, and FIG. 4C shows an illustrative data flow through the link in FIG. 4B. As illustrated, the communication link 450 of FIG. 4B provides connectivity between enterprise customer premises equipment (CPE) 160 and an enterprise head-end 405. Communications on the communication link 450 may pass from the enterprise remote site to a gateway 215 (e.g., from the CPE 160 to the gateway via a user terminal and a satellite link 105), from the gateway 215 to a core node 265 (e.g., from an L2 backhaul switch in the gateway to an gateway and L2/L3 switch in the core), and from the core to the enterprise head-end 405 (e.g., from the L2/L3 switch in the core to a peer router in the head-end via a leased line). The data flow 460 in FIG. 4C shows illustrative data stacks at various locations (410, 415, 420, and 425) in the communication link 450 of FIG. 4B. It is worth noting, for example, that the bottom four layers of the illustrative data stack remains intact throughout the communication link 450.

As discussed above, the non-routed ground segment network (e.g., like the network 400 of FIG. 4A) may include a number of different types of nodes in various types of configurations. Some of these different types of nodes and node configurations are described with reference to FIGS. 5-9.

Figure 5:
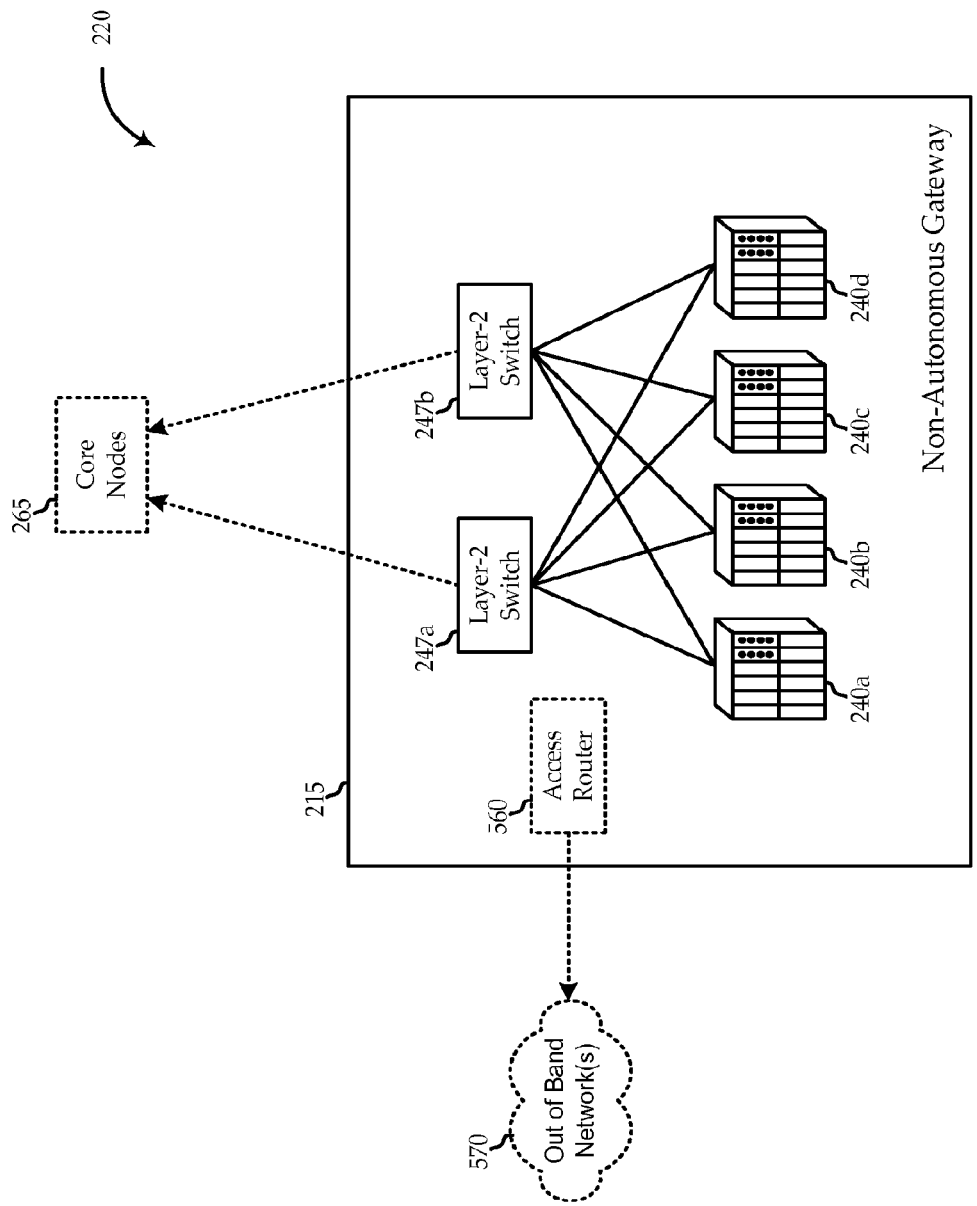
FIG. 5, an embodiment of a non-autonomous gateway is shown as part of a portion of a non-routed ground segment network, according to various embodiments.

Turning first to FIG. 5, an embodiment of a non-autonomous gateway 215 is shown as part of a portion of a non-routed ground segment network 220.

The non-autonomous gateway 215 includes a number of SMTSs 240. Embodiments of each SMTS 240 include multiple base stations. For example, each base station may be implemented on a circuit card or other type of component integrates into the SMTS 240. The illustrated non-autonomous gateway 215 includes four STMSs 240, each in communication with two L2 switches 247. For example, each SMTS 240 is coupled with both L2 switches 247 to provide redundancy and/or other functionality. Each L2 switch 247 may then be in communication (e.g., directly or via other nodes of the non-routed ground segment network 220 that are not shown) with one or more core nodes 265. For example, each L2 switch 247 may be in communication with a single core node 265, so that the non-autonomous gateway 215 is effectively in substantially redundant communication with two core nodes 265.

Embodiments of the non-autonomous gateway 215 are configured to support other types of communication, for example, with other networks. In one embodiment, one or more service providers are in communication with the non-routed ground segment network 220 via one or both of the L2 switches 247 or one or more of the core nodes 265. In one embodiment, the non-autonomous gateway 215 includes an access router 560. The access router 560 may be configured to interface with (e.g., provide connectivity with) one or more out-of-band networks 570.

Figure 6:
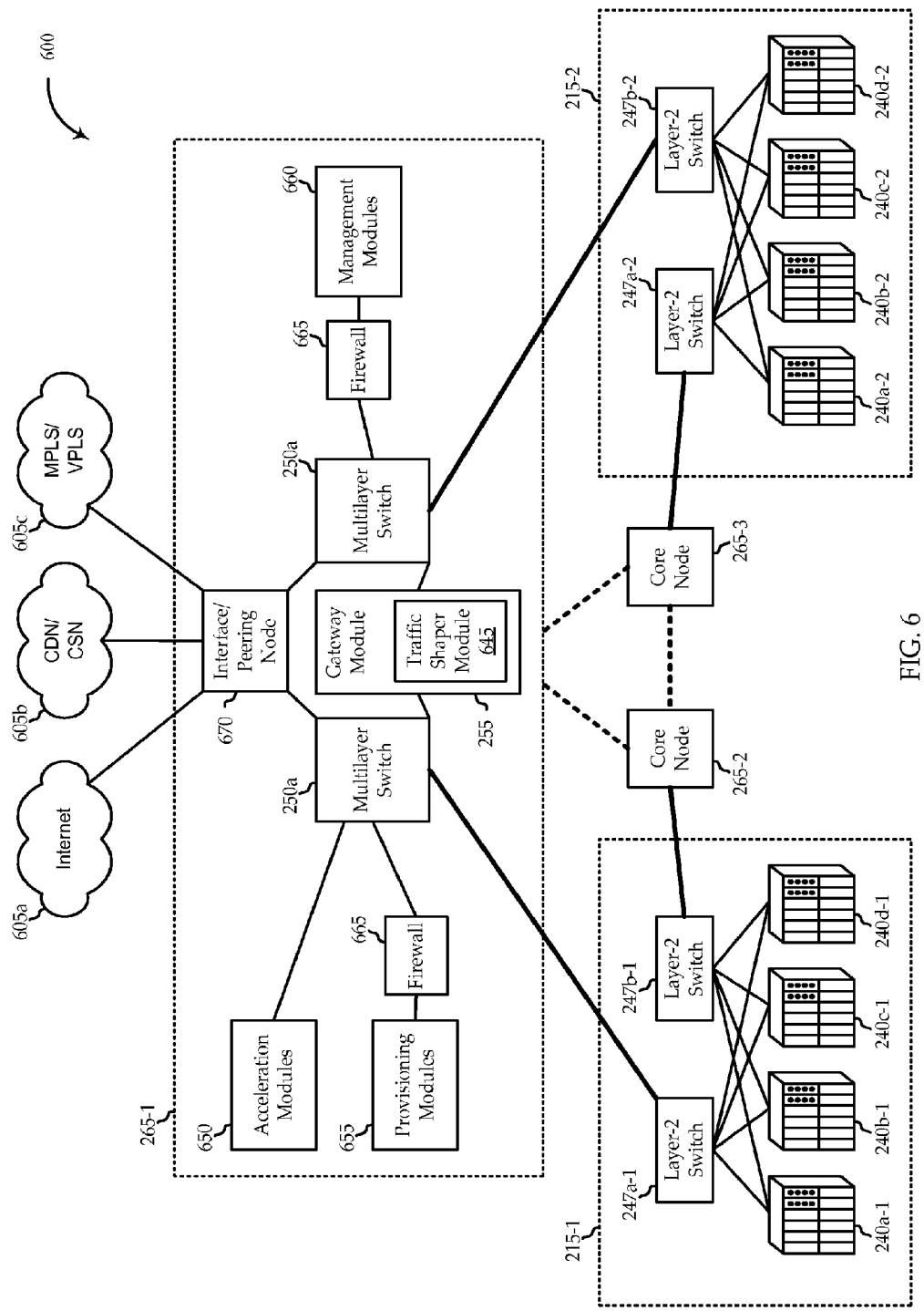
FIG. 6 shows an embodiment of a communications system having multiple non-autonomous gateways, like the non-autonomous gateway of FIG. 5, in communication with a more detailed illustrative embodiment of a core node, according to various embodiments.

As described above, the L2 switches 247 in the non-autonomous gateway 215 are in communication with one or more core nodes 265 so as to facilitate persistent layer-2 connectivity. FIG. 6 shows an embodiment of a communications system 600 having multiple non-autonomous gateways 215, like the non-autonomous gateway 215 of FIG. 5, in communication with a more detailed illustrative embodiment of a core node 265, according to various embodiments. As in FIG. 5, each non-autonomous gateway 215 includes multiple SMTSs 240, each in communication with multiple L2 switches 247. Each L2 switch 247 is shown to be in communication with a core node 265, so that the non-autonomous gateway 215 is effectively in substantially redundant communication with multiple core nodes 265. Further, in some embodiments, each core node 265 is in communication with each other core node 265, either directly or indirectly. For example, the core nodes 265 may be in communication in a ring-like topology, a mesh-like topology, etc.

As discussed above, the non-autonomous gateways 215 communicate with the core nodes 265 using layer-2 connectivity between one or more L2 switches 247 in the non-autonomous gateways 215 and one or more multilayer switches 250 in the core nodes 265. The illustrative first core node 265-1 is in communication with multiple non-autonomous gateways 215 via two multilayer switches 250. In various embodiments, the multilayer switches 250 are in communication with each other either directly or indirectly (e.g., via an gateway module 255).

In some embodiments, the gateway module 255 includes one or more processing components for processing traffic received at the multilayer switches 250. In one embodiment, the gateway module 255 includes a traffic shaper module 645. Embodiments of the traffic shaper module 645 are configured to help optimize performance of the communications system 600 (e.g., reduce latency, increase effective bandwidth, etc.), for example, by delaying packets in a traffic stream to conform to one or more predetermined traffic profiles.

The multilayer switches 250 may further be in communication with one or more networks 605. The networks 605 may include the Internet 605a, one or more CDNs 605b, one or more MPLS or VPLS networks 605c, etc. In some embodiments, the core node 265 includes an interface/peering node 670 for interfacing with these networks 605. For example, an Internet service provider or CDN service provider may peer with the core node 265 via the interface/peering node 670.

Embodiments of the multilayer switches 250 process data by using one or more processing modules in communication with the multilayer switches 250. For example, as illustrated, the multilayer switches 250 may be in communication with acceleration modules 650, provisioning modules 655, and/or management modules 660. Communications with some or all of these modules may be protected using components, like firewalls 665. For example, certain modules may have access to (and may use) private customer data, proprietary algorithms, etc., and it may be desirable to insulate that data from unauthorized external access. In fact, it will be appreciated that many types of physical and/or logical security may be used to protect operations and data of the core nodes 265. For example, each core node 265 may be located within a physically secured facility, like a guarded military-style installation.

Figure 7:
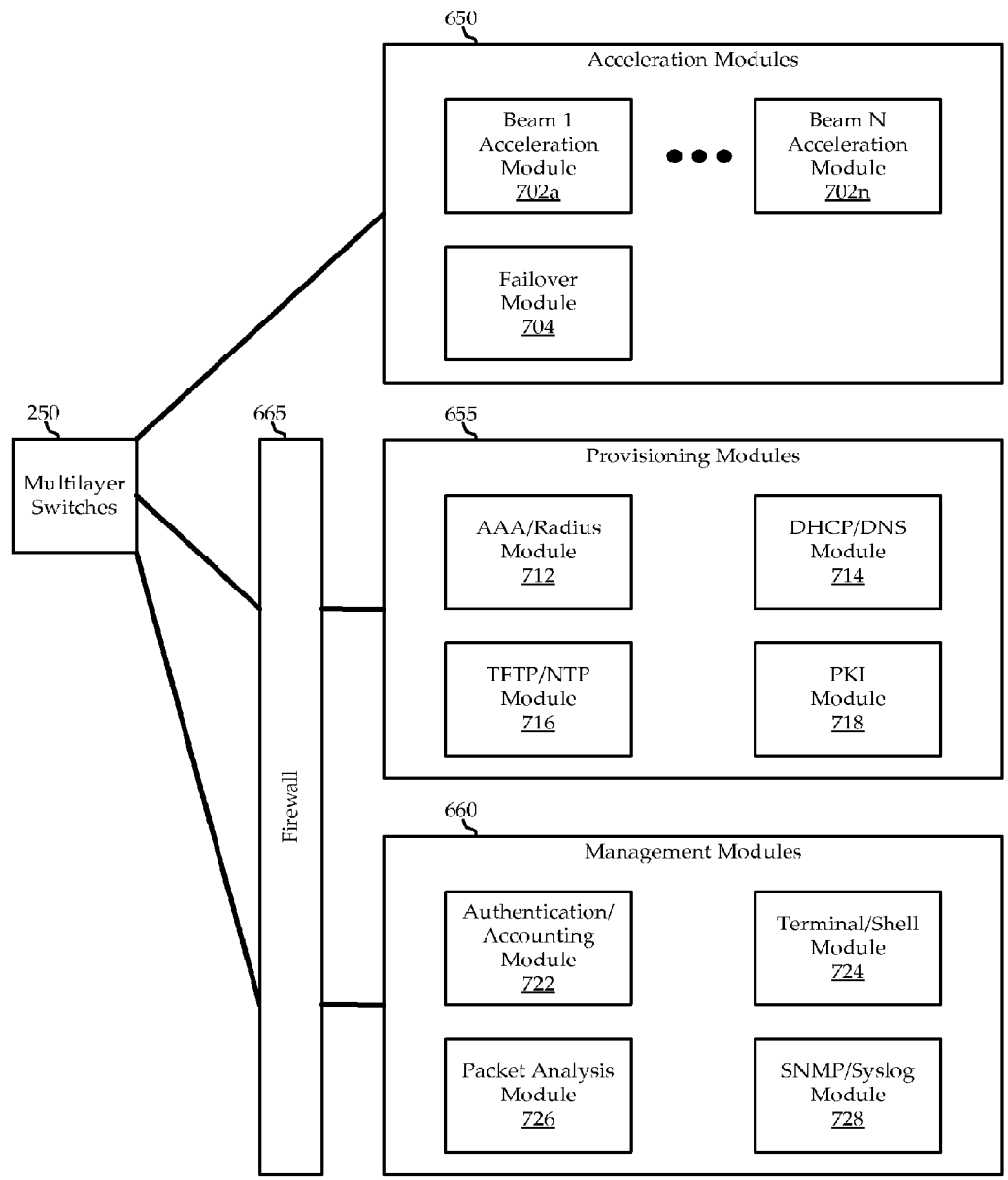
FIG. 7 shows embodiments of various modules in communication with one or more multilayer switches, according to various embodiments.

FIG. 7 shows embodiments of various modules in communication with one or more multilayer switches 250, according to various embodiments. As in the first core node 265-1 of FIG. 6, FIG. 7 shows multilayer switches 250 in communication with acceleration modules 650, provisioning modules 655, and management modules 660. The multilayer switches 250 are in communication with the provisioning modules 655 and management modules 660 via a firewall 665. It is worth noting that the illustrated modules are intended only to show one non-limiting embodiment. Many other types of modules, units, groupings, configurations, etc. are possible according to other embodiments.

In one embodiment, the acceleration modules 650 include beam-specific acceleration modules 702 and a failover module 704 which detects a connection failure and redirects network traffic to a backup or secondary connection. Embodiments of the acceleration modules 650 provide various types of application, WAN/LAN, and/or other acceleration functionality. In one embodiment, the acceleration modules 650 implement functionality of AcceleNet applications from Intelligent Compression Technologies, Inc. ("ICT"), a division of ViaSat, Inc. This functionality may be used to exploit information from higher layers of the protocol stack (e.g., layers 4-7 of the OSI stack) through use of software or firmware operating in each beam-specific acceleration module 702. The acceleration modules 650 may provide high payload compression, which may allow faster transfer of the data and enhances the effective capacity of the network. In some embodiments, real-time types of data (e.g., User Datagram Protocol (UDP) data traffic) bypass the acceleration modules 650, while non-real-time types of data (e.g., Transmission Control Protocol (TCP) data traffic) are routed through the accelerator module 350 for processing. For example, IP television programming may bypass the acceleration modules 650, while web video may be sent to the acceleration modules 650 from the multilayer switches 250.

In one embodiment, the provisioning modules 655 include a AAA/Radius module 712, a DHCP/DNS module 714, a TFTP/NTP module 716, and a PM module 718.

Embodiments of the AAA/Radius module 712 perform certain types of authentication and accounting functionality. For example, the AAA/Radius module 712 may implement functionality of an Authentication Authorization Accounting (AAA) server, a Remote Authentication Dial-In User Service (RADIUS) protocol, an Extensible Authentication Protocol (EAP), a network access server (NAS), etc. Embodiments of the DHCP/DNS module 714 implement various IP management functions, including Dynamic Host Configuration Protocol (DHCP) interpretation, Domain Name System (DNS) look-ups and translations, etc. Embodiments of the TFTP/NTP module 716 implement various types of protocol-based functions, including file transfer protocols (e.g., File Transfer Protocol (FTP), trivial file transfer protocol (TFTP), etc.), synchronization protocols (e.g., Network Time Protocol (NTP)), etc. Embodiments of the PKI module 718 implement various types of encryption functionality, including management of Public Key Infrastructures (PKIs), etc.

In one embodiment, the management modules 660 include an authentication/accounting module 722, a terminal/shell module 724, a packet analysis module 726, an SNMP/Syslog module 728, etc. Embodiments of the authentication/accounting module 722 implement various authentication and accounting functions that may be similar to or different from those of the AAA/Radius module 712. For example, the authentication/accounting module 722 may control certain billing functions, handle fair access policies (FAPs), etc. Embodiments of the terminal/shell module 724 implement various types of connectivity with individual devices. Embodiments of the packet analysis module 726 implement various packet analysis functions. For example, the packet analysis module 726 may collect packet-level information and/or statistics for use in certain types of accounting functions. Embodiments of the SNMP/Syslog module 728 implement various network protocol management and logging functions. For example, the SNMP/Syslog module 728 may use the Simple Network Management Protocol (SNMP) to expose network management information and the Syslog standard to log network messages.

It is worth noting that the functionality of the various modules is described as occurring within one or more core modules 265, and the core modules are in communication with a distributed network of non-autonomous gateways 115 and/or other nodes. While this type of distributed non-routing networking may be preferred in many environments, it may be difficult (e.g., not cost-effective or technologically inefficient) or impractical for a gateway to communicate with a core node 265. As such, it may be desirable in some environments to implement a so-called autonomous gateway having at least some of the combined functionality of a non-autonomous gateway 215 and a core node 265.

Figure 8:
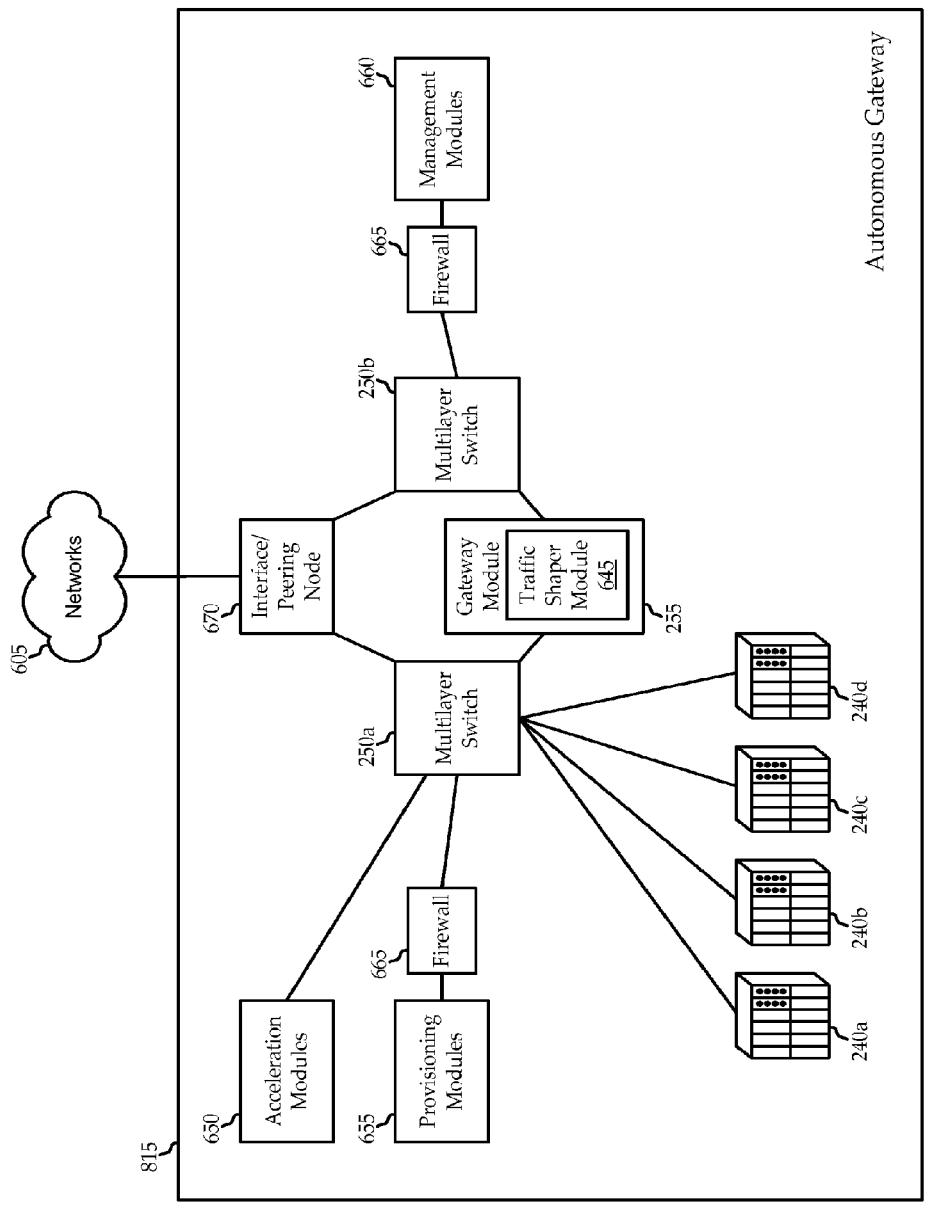
FIG. 8 shows an embodiment of an autonomous gateway, according to various embodiments.

FIG. 8 shows an embodiment of an autonomous gateway 815, according to various embodiments. In some embodiments, the autonomous gateway 815 includes one or more SMTSs 240, which may be implements substantially as the SMTSs 240 of the non-autonomous gateway 215 of FIG. 2. The SMTSs 240 may be in communication with one or more multilayer switches 250. The multilayer switches 250 may be in communication with a gateway module 255 and an interface/peering node 670. The interface/peering node 670 may be in communication with one or more other networks 605. It is worth noting that the gateway module 255 may include other functionality in certain embodiments. For example, the illustrated embodiment includes a traffic shaper module 645. In other embodiments, the traffic shaper module 645 may be implemented differently or as part of a different component. The multilayer switches 250 may be configured to process data using one or more modules. For example, the multilayer switches 250 may be in communication with acceleration modules 650, provisioning modules 655, and/or management modules 660, for example, through one or more firewalls 665.

It will be appreciated that, unlike the typical gateway 115 of FIG. 1, in accordance with aspects of the present invention, embodiments of the autonomous gateway are able to implement some of the enhanced (e.g., Layer-2 connectivity-enabled) functionality of the non-autonomous gateways 215 and core nodes 265.

Figure 9:
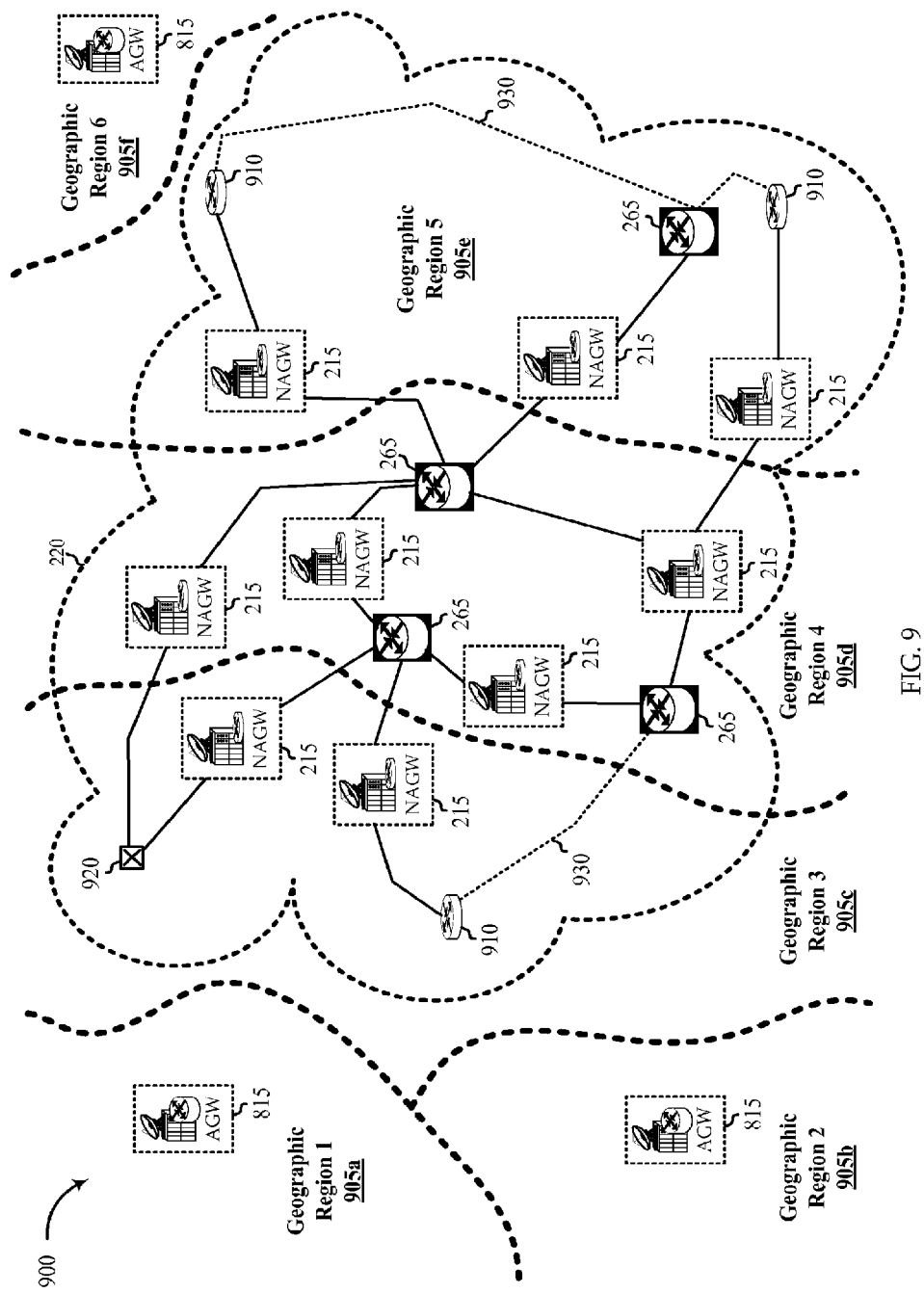
FIG. 9 shows an embodiment of a satellite communications system that distributes autonomous gateways and non-autonomous gateways across a number of geographically dispersed regions, according to various embodiments.

FIG. 9 shows an embodiment of a satellite communications system 900 that distributes autonomous gateways 815 and non-autonomous gateways 215 across a number of geographically dispersed regions 905, according to various embodiments. In one embodiment, a first geographic region 905a, a second geographic region 905b and a sixth geographic region 905f represent environments where it is not cost-effective to provide communications with core nodes 265. As such, these geographic regions 905 are illustrated as having autonomous gateways 815. For example, autonomous gateways 815 may be used in island regions, geographically remote regions, regions with particular types of topologies (e.g., large mountain ranges), etc.

In contrast to the above-mentioned regions (geographic regions 905a, 905b, and 905f), a third geographic region 905c, a fourth geographic region 905d, and a fifth geographic region 905e indicate regions where it is cost-effective to implement a core-based non-routed ground segment network 220. As illustrated, each non-autonomous gateway 215 is either directly or indirectly in communication with at least one core node 265 (e.g., typically two core nodes 265). Other components may also be included in the non-routed ground segment network 220. For example, additional switches 910, optical cross-connects 920, etc. may be used. Further, while the non-routed ground segment network 220 is configured to provide point-to-point layer-2 connectivity, other types of connectivity may also be implemented between certain nodes. For example, one or more VPLS networks may be implemented to connect certain nodes of the non-routed ground segment network 220.

In various embodiments, core nodes 265 may be located on a new or existing fiber run, for example, between metropolitan areas. In some configurations, the core nodes 265 may be located away from the majority of spot beams (e.g., in the middle of the country, where much of the subscriber population lives closer to the outsides of the country). In alternative embodiments, core nodes 265 may be located near the majority of spot means.

Such spatial diversity between code nodes and subscriber terminals may, for example, facilitate frequency re-use of between service beams and feeder beams. Similarly, non-autonomous gateways 215 may be located to account for these and/or other considerations.

It is worth noting that, in the non-routed ground segment network 220, twelve gateways (e.g., including both non-autonomous gateways 215 and autonomous gateways 815) are illustrated. If all were implemented as autonomous gateways 815, the topology may require twelve gateway modules, routers, switches, and other hardware components. Further, various licensing and/or support services may have to be purchased for each of the autonomous gateways 815. In some cases, licensing requirements may dictate a minimum purchase of ten thousand licenses for each gateway module, which may require an initial investment into 120-thousand licenses from the first day of operation.

Using aggregated functionality in one or more core nodes 265, however, may minimize some of these issues. For example, the non-routed ground segment network 220 includes four core nodes 265, each having a gateway module, and only three of the twelve gateways are autonomous gateways 815. As such, only seven gateway modules may be operating on the non-routed ground segment network 220. As such, only seven instances of each core networking component may be needed, only seven licenses may be needed, etc. This may allow for a softer ramp-up and other features.

Figure 10:
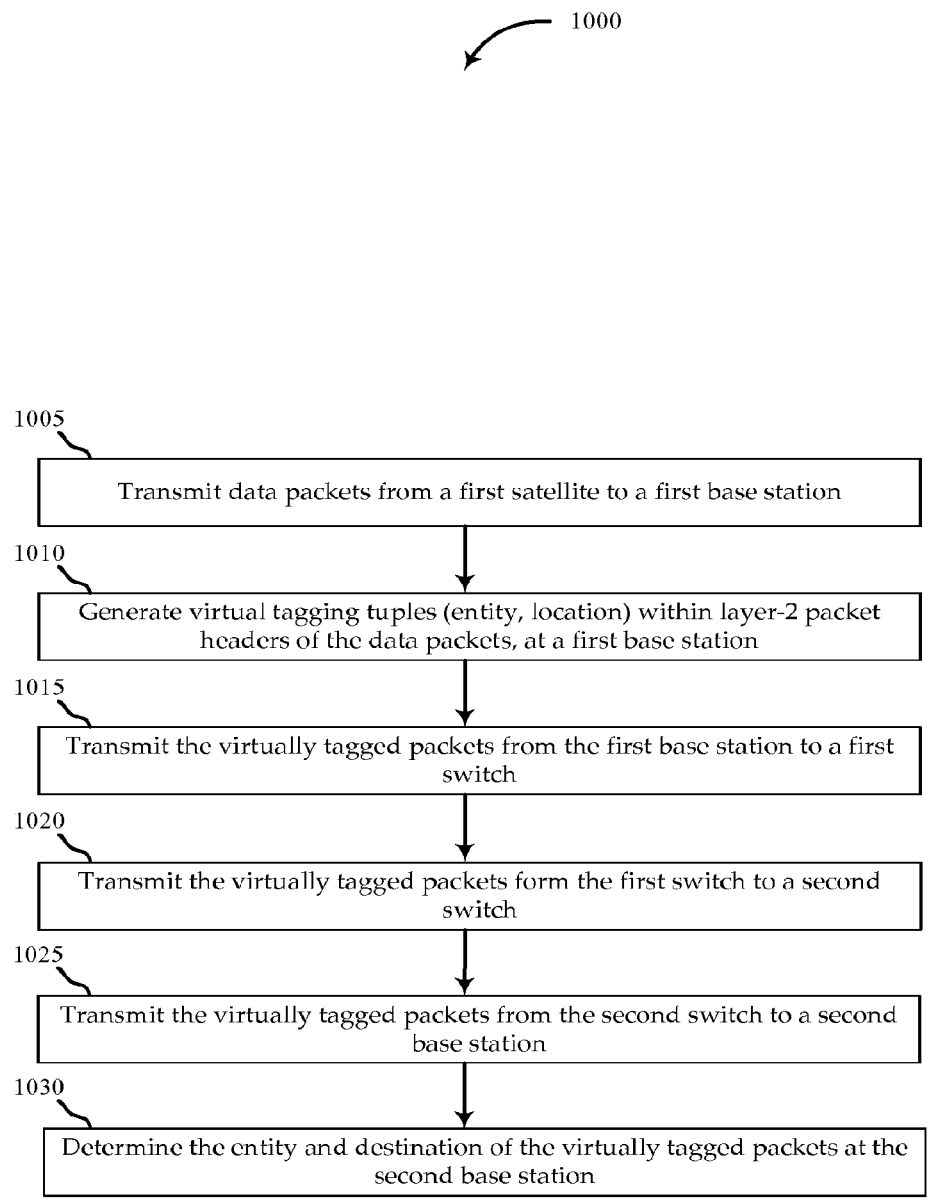
FIG. 10 is a flow diagram illustrating a method of a satellite communications system having a user terminal in communication with another user terminal via a satellite, where the non-autonomous gateway is further in communication with nodes of a non-routed ground segment network using virtual tagging tuples, according to various embodiments.

FIG. 10 shows an illustrative flow diagram of a method of implementing access node/gateway to access node/gateway layer-2 connectivity within a backhaul ground segment network connected to one or more satellites. At process block 1005, data packets may be transmitted form a first satellite to a first base station. The first base station may then generate virtual tagging tuples to include in the layer-2 header (process block 1010).

Furthermore, the first base station then transmits the virtually tagged packets to a first switch (process block 1015), and the first switch transmits the packets to a second switch (process block 1020). Then, at process block 1025, the second switch transmits the packets to a second base station which determines, based on the virtual tagging tuple, the entity and destination of the packets (process block 1030).

Figure 11:
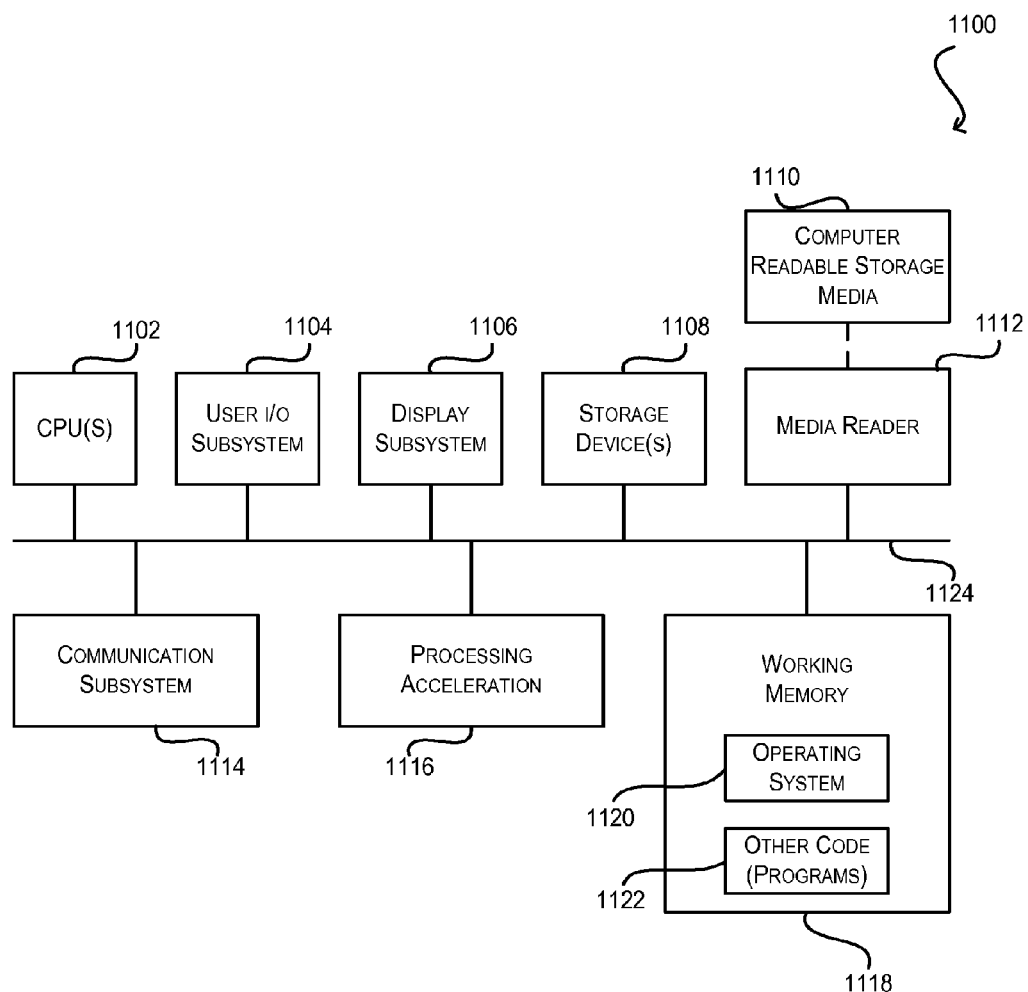
FIG. 11 is a simplified block diagram illustrating the physical components of a computer system that may be used in accordance with an embodiment of the present invention.

FIG. 11 is a simplified block diagram illustrating the physical components of a computer system 1100 that may be used in accordance with an embodiment of the present invention. This diagram is merely an example, which should not unduly limit the scope of the claims. One of ordinary skill in the art would recognize many variations, alternatives, and modifications.

In various embodiments, computer system 1100 may be used to implement any of the computing devices of the present invention. As shown in FIG. 11, computer system 1100 comprises hardware elements that may be electrically coupled via a bus 1124. The hardware elements may include one or more central processing units (CPUs) 1102, one or more input devices 1104 (e.g., a mouse, a keyboard, etc.), and one or more output devices 1106 (e.g., a display device, a printer, etc.). For example, the input devices 1104 are used to receive user inputs for procurement related search queries. Computer system 1100 may also include one or more storage devices 1108. By way of example, storage devices 1108 may include devices such as disk drives, optical storage devices, and solid-state storage devices such as a random access memory (RAM) and/or a read-only memory (ROM), which can be programmable, flash-updateable and/or the like. In an embodiment, various databases are stored in the storage devices 1108. For example, the central processing unit 1102 is configured to retrieve data from a database and process the data for displaying on a GUI.

Computer system 1100 may additionally include a computer-readable storage media reader 1112, a communications subsystem 1114 (e.g., a modem, a network card (wireless or wired), an infra-red communication device, etc.), and working memory 1118, which may include RAM and ROM devices as described above. In some embodiments, computer system 1100 may also include a processing acceleration unit 1116, which can include a digital signal processor (DSP), a special-purpose processor, and/or the like.

Computer-readable storage media reader 1112 can further be connected to a computer-readable storage medium 1110, together (and, optionally, in combination with storage devices 1108) comprehensively representing remote, local, fixed, and/or removable storage devices plus storage media for temporarily and/or more permanently containing computer-readable information. Communications system 1114 may permit data to be exchanged with network and/or any other computer.

Computer system 1100 may also comprise software elements, shown as being currently located within working memory 1118, including an operating system 1120 and/or other code 1122, such as an application program (which may be a client application, Web browser, mid-tier application, RDBMS, etc.). In a particular embodiment, working memory 1118 may include executable code and associated data structures for one or more of design-time or runtime components/ services. It should be appreciated that alternative embodiments of computer system 1100 may have numerous variations from that described above. For example, customized hardware might also be used and/or particular elements might be implemented in hardware, software (including portable software, such as applets), or both. Further, connection to other computing devices such as network input/output devices may be employed. In various embodiments, the behavior of the view functions described throughout the present application is implemented as software elements of the computer system 1100.

In one set of embodiments, the techniques described herein may be implemented as program code executable by a computer system (such as a computer system 1100) and may be stored on machine-readable media. Machine-readable media may include any appropriate media known or used in the art, including storage media and communication media, such as (but not limited to) volatile and non-volatile, removable and non-removable media implemented in any method or technology for storage and/or transmission of information such as machine-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store or transmit the desired information and which can be accessed by a computer.

While the principles of the disclosure have been described above in connection with specific apparatuses and methods, it is to be clearly understood that this description is made only by way of example and not as limitation on the scope of the disclosure. Further, while the invention has been described with respect to exemplary embodiments, one skilled in the art will recognize that numerous modifications are possible. For example, the methods and processes described herein may be implemented using hardware components, software components, and/or any combination thereof Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A system for providing end-to-end layer-2 connectivity throughout a non-routed ground segment network connected to one or more satellites, the system comprising:
    a first non-autonomous gateway configured for processing primarily below layer-3 of the OSI-model (L3), the first non-autonomous gateway in communication with a bent pipe satellite that receives signals from one or more user terminals and relays the signals to the first non-autonomous gateway at layer-1 of the OSI-model (L1), the first non -autonomous gateway comprising:
        a satellite modem termination system (SMTS) that demodulates the signals relayed from the bent pipe satellite and generates from the demodulated signals, a plurality of data packets having packet headers for layer-2 of the OSI-model (L2); and
        a switch coupled with the SMTS that receives the plurality of data packets from the SMTS and adds virtual tagging tuples to the packet headers for each data packet of a subset of the plurality of data packets;
    wherein the switch of the first non-autonomous gateway sends, via a ground-based L2 switch in communication with the first non-autonomous gateway, the subset of the plurality of data packets to a second non-autonomous gateway for transmission to an entity based on the virtual tagging tuples associated with each of the subset of the plurality of data packets.

2. The system of claim 1, further comprising a core node comprising the ground-based L2 switch.

3. The system of claim 2, wherein the non-routed ground segment network comprises the first non-autonomous gateway, the core node, and the second non-autonomous gateway.

4. The system of claim 2, wherein the core node further comprises a gateway module in communication with the ground-based L2 switch and a routed ground segment network, the gateway module configured to generate routing data for communicating data packets through the routed ground segment network.

5. The system of claim 1, wherein the SMTS comprises one or more base stations.

6. The system of claim 1, wherein the virtual tagging tuples are configured to designate a location of the entity.

7. The system of claim 6, wherein the location of the entity comprises one of a plurality of locations associated with the entity.

8. The system of claim 1, wherein the virtual tagging tuples are associated with a reserved portion of a link capacity of the non-routed ground segment network between the first non-autonomous gateway and the second non-autonomous gateway.

9. The system of claim 1, further comprising a plurality of clients in communication with the one or more user terminals.

10. A method for providing end-to-end layer-2 connectivity throughout a non-routed ground segment network connected to one or more satellites, the method comprising:
    receiving, by a first non-autonomous gateway configured for processing primarily below layer-3 of the OSI model (L3), signals from one or more user terminals, the signals relayed by a bent pipe satellite at layer-1 of the OSI model (L1);

demodulating the signals relayed from the bent pipe satellite;

generating a plurality of data packets from the demodulated signals, the plurality of data packets having packet headers for layer-2 of the OSI-model (L2);

adding virtual tagging tuples to the packet headers for each data packet of a subset of the plurality of data packets; and sending, via a ground-based L2 switch in communication with the first non-autonomous gateway, the subset of the data packets to a second non-autonomous gateway for transmission to an entity based on the virtual tagging tuples associated with each of the subset of the plurality of data packets.

11. The method of claim 10, further comprising:
designating, using the virtual tagging tuples, the entity and a location for the entity.

12. The method of claim 11, wherein the location of the entity comprises one of a plurality of locations associated with the entity.

13. The method of claim 11, further comprising:
adding second virtual tagging tuples to the packet headers for each data packet of a second subset of the plurality of data packets;
designating, using the second virtual tagging tuples, a second entity and a location for the second entity; and
sending, via the ground-based L2 switch, the second subset of the plurality of data packets to the second entity based on the second virtual tagging tuples associated with each of the second subset of the plurality of data packets.

14. The method of claim 13, wherein the first and second locations comprise a same location.

15. The method of claim 13, wherein the first and second entities comprise a same entity.

16. The method of claim 10, wherein the virtual tagging tuples are associated with a reserved portion of a link capacity of the non-routed ground segment network between the first non-autonomous gateway and the second non-autonomous gateway.

17. A non-transitory computer-readable medium for providing end-to-end layer-2 connectivity throughout a non-routed ground segment network connected to one or more satellites, the computer-readable medium having sets of instructions stored thereon which, when executed by a computer, cause the computer to:

receive, by a first non-autonomous gateway configured for processing primarily below layer-3 of the OSI model (L3), signals from one or more user terminals, the signals relayed by a bent pipe satellite at layer-1 of the OSI model (L1);

demodulate the signals relayed from the bent pipe satellite;

generate a plurality of data packets from the demodulated signals, the plurality of data packets having packet headers for layer-2 of the OSI-model (L2);

add virtual tagging tuples to the packet headers for each data packet of a subset of the plurality of data packets; and send, via a ground-based L2 switch in communication with the first non-autonomous gateway, the subset of the data packets to a second non-autonomous gateway for transmission to an entity based on the virtual tagging tuples associated with each of the subset of the plurality of data packets.

18. The computer-readable medium of claim 17, further comprising instructions stored thereon which, when executed by the computer, causes the computer to:
designate, using the virtual tagging tuples, the entity and a location for the entity.

19. The computer-readable medium of claim 18, wherein the location of the entity comprises one of a plurality of locations associated with the entity.

20. The computer-readable medium of claim 17, wherein the virtual tagging tuples are associated with a reserved portion of a link capacity of the non-routed ground segment network between the first non-autonomous gateway and the second non-autonomous gateway.

* * * * *